United States Patent
Polz et al.

(10) Patent No.: US 6,637,536 B1
(45) Date of Patent: Oct. 28, 2003

(54) FRONT HOOD ASSEMBLY

(75) Inventors: Andreas Polz, Gelsenkirchen (DE); Peter Schlegel, Wuppertal (DE); Jörg Schneppenheim, Germering (DE)

(73) Assignee: Edscha AG, Remscheid (DE)

(*) Notice: Subject to any disclaimer, the term of this patent is extended or adjusted under 35 U.S.C. 154(b) by 0 days.

(21) Appl. No.: 09/979,235
(22) PCT Filed: May 17, 2000
(86) PCT No.: PCT/DE00/01601
§ 371 (c)(1), (2), (4) Date: Jan. 28, 2002
(87) PCT Pub. No.: WO00/69707
PCT Pub. Date: Nov. 23, 2000

(30) Foreign Application Priority Data

May 17, 1999 (DE) .......................... 199 22 459

(51) Int. Cl.⁷ .................................. B60D 1/28
(52) U.S. Cl. ........................................ 180/271
(58) Field of Search ................. 180/271, 274, 180/69.2, 69.21

(56) References Cited

U.S. PATENT DOCUMENTS

| | | | |
|---|---|---|---|
| 3,419,099 A | * 12/1968 | Brumbaugh et al. | 180/69.24 |
| 4,249,632 A | * 2/1981 | Lucchini et al. | 180/274 |
| 5,311,963 A | * 5/1994 | Shigeoka et al. | 180/274 |
| 5,448,856 A | * 9/1995 | Moore et al. | 49/340 |
| 6,182,782 B1 | * 2/2001 | Matsuura et al. | 180/274 |
| 6,332,115 B1 | * 12/2001 | Nobusawa et al. | 702/142 |

FOREIGN PATENT DOCUMENTS

| | | |
|---|---|---|
| DE | 2711338 | 9/1978 |
| DE | 2711339 | 9/1978 |
| DE | 2737876 | 3/1979 |
| DE | 2841315 | 4/1980 |
| DE | 2922893 | 1/1989 |
| DE | 19721565 | 12/1997 |
| DE | 19710417 | 9/1998 |
| DE | 19712961 | 10/1998 |
| EP | 0509690 | 10/1992 |
| EP | 0914992 | 5/1999 |
| EP | 0926018 | 6/1999 |
| JP | 09315266 | 12/1997 |
| JP | 10194158 | 7/1998 |
| JP | 10258774 | 9/1998 |
| WO | 9718108 | 5/1997 |

* cited by examiner

Primary Examiner—Paul N. Dickson
Assistant Examiner—Faye M. Fleming
(74) Attorney, Agent, or Firm—Davidson, Davidson & Kappel, LLC

(57) ABSTRACT

A front hood assembly has a front hood of a motor vehicle that is hinged to the chassis of the motor vehicle via at least one hinge, said front hood being lockable via at least one hood lock. The hinge comprises means for displacing a joint depending on the vehicle speed to an upper or a lower position, independent of whether a collision with a pedestrian has taken place or not. The assembly provides a protection for pedestrians that is technically feasible and can be implemented at low cost. In a method for actuating the front hood of a motor vehicle depending on the vehicle speed, the front hood is displaced into a lifted position at least in the area of its hinges if a lower threshold value of the vehicle speed is exceeded or if the vehicle speed falls below an upper threshold value.

16 Claims, 1 Drawing Sheet

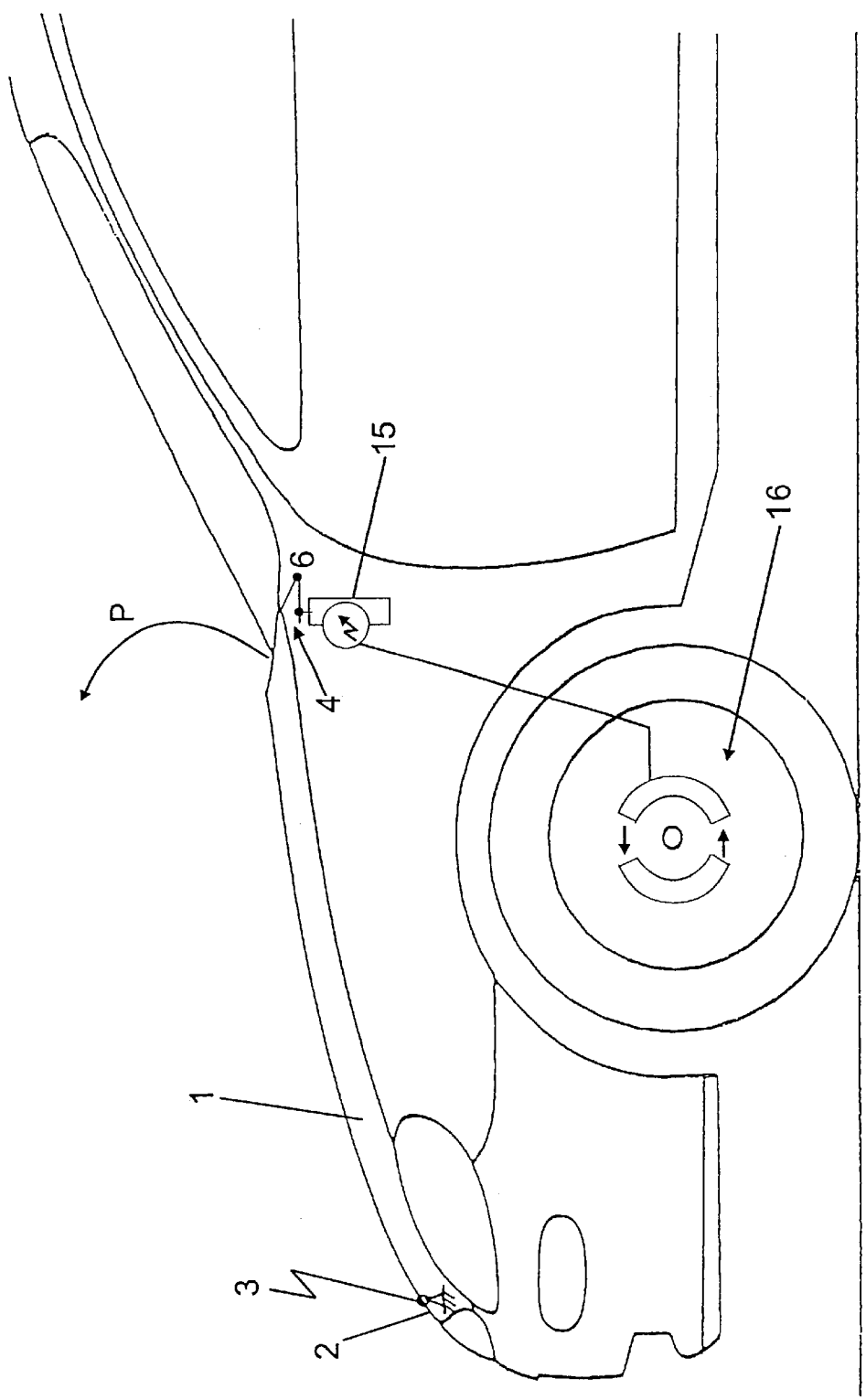

FRONT HOOD ASSEMBLY

BACKGROUND OF THE INVENTION

The invention relates to a front-hood arrangement wherein a front hood of a vehicle is coupled via a hinge to the frame of a vehicle, which front hood can also be closed by means of at least one hood lock. The invention also relates to a method for actuating the front hood of a vehicle as a function of the vehicle speed.

By now, numerous safety devices, such as airbags and the like, for passengers in automobiles are known from practical applications. By contrast, protective measures for pedestrians who are hit by the front end of a passenger automobile have to date scarcely been proposed or implemented in practice. Accidents involving pedestrians which take place at speeds of up to 60 km/h have proven particularly problematical, since, if the pedestrian is hit head-on, his head often strikes the engine hood of the passenger automobile, and the pedestrian dies from his injuries. The seriousness of the injury results from the fact that although the front or engine hood, which is usually formed from thin metal sheet, would tend to bend, it then strikes parts which are arranged beneath the engine hood and in practice cannot be deformed or can only be deformed with difficulty, such as the engine block, the suspension-leg carrier, the air filter, the valve cover or the frame side and cross members of the vehicle. It would be desirable if the consequences of an impact in particular of the head of a pedestrian could be made less severe. By contrast, at speeds of over 60 km/h, the pedestrian, after he has been hit, is thrown over the vehicle.

DE-C-29 22 893 proposes that the engine hood and the wing, in the region of the joint formed between these two parts, be supported, by means of energy-absorbing U-sections which run along the two parts, on body components, and in the event of a collision these U-sections convert the impact into deformation energy. A first drawback of this arrangement is that considerable forces have to act on the sections in order to bend them. Moreover, these otherwise useless U-sections are expensive to procure and difficult to fit.

DE-A-27 37 876 describes an impact protection device which uses a prestressed pivot flap to displace a mesh-like absorption element out of an at-rest position, in which the mesh rests substantially on the front hood, into an absorbing position, which runs substantially in front of the windshield of the automobile. This device is used more to protect the windshield than the pedestrian from an excessively hard impact on the front hood. Moreover, any contact with the sensor which triggers the pivoting movement and is integrated in the front bumper can cause the mesh to be triggered, with the result that a whole range of situations arise in which the mesh completely blinds the driver.

DE-A-28 41 315 describes a safety device in which, in reaction to a signal from a sensor arranged at the front of a vehicle, to detect a collision with a pedestrian, the front hood is displaced out of an at-rest position into an impact position, which is raised with respect to the at-rest position, by a piston-cylinder unit, the displacement being effected by an energy store. During the raising operation, the front hood is pivoted about a horizontal pivot pin which is arranged at the front of the vehicle.

DE-A-197 10 417 describes an arrangement for lifting the front hood in which pivoting about a horizontal pivot pin arranged at the front of the vehicle is triggered by the same pneumatic spring which also assists with the raising of the front hood which is coupled to the other end.

DE-A-197 21 565 describes a safety device on motor vehicles for raising the front hood in which the raising of the front hood takes place in a speed-dependent manner by means of a mechanism which is integral with the hood lock. For this purpose, either the unlocking of the lock which is acted on by a compression spring, which for safety reasons is normally triggered from the driver's compartment, is triggered by a sensor which is triggered by an impact, or alternatively, particularly at relatively high speeds, a piston-cylinder unit which is integrated in the catch bolt of the hood lock is expanded by a propelling charge. A first drawback of this arrangement is that the force required to close the front hood must not exceed a defined threshold, in order to allow the driver to close the front hood with ease. Since the forces which strike in the event of an accident involving a person are considerable, the front hood is pressed down rapidly, and the known injuries occur, in particular in the region of the head. Providing a propelling charge in order to expand a piston-cylinder unit also causes problems, since the service life of this charge, in particular in a relatively unprotected arrangement, is limited, and the charge is difficult to exchange. Moreover, there is a risk of the compression spring and the piston-cylinder unit being triggered simultaneously, with the result that the opening of the front hood would become so great that the air stream would bring the hood into contact with the windshield, thus preventing the driver from being able to see.

DE-A-27 11 338 describes a device for damping the impact of a pedestrian, in which an airbag is arranged in the region of the cowl, the filling of which airbag is triggered by a sensor signal. In this case, the airbag may be arranged in such a way that, at the same time, it raises a part of the front hood; to do this it overcomes a spring force which preloads two links, which are connected to one another via a rotation point and one of which is arranged rotatably on the front hood and the other of which is arranged rotatably on a fixed part of the motor vehicle, into an angled position. Furthermore, it is proposed to arrange resilient profiled bodies in strip form in the manner of a seal between hood and side parts, in order in this way to provide further protection in the event of an impact.

DE-A-27 11 339 describes a front hood which is coupled at the front side and in which the coupling is designed to be resilient, in such a manner that it allows horizontal displacement of the front hood through the impact of a pedestrian, the front hood which is displaced toward the rear being connected at the rear side to one end of a rigid locking element, the other end of which, in the event of displacement of the front hood toward the rear, is displaced upward and toward the rear in a guide curve in such a manner that the front hood executes an upward movement. This lifting only takes place if horizontal displacement of the front hood has actually occurred, which is not always the case, for example, in the event of impacts of children.

EP-A-0 509 690 describes a front hood, which at its front side is coupled to the vehicle structure in such a manner that, as a result of an impact, the front hood is displaced toward the rear, the closure or pivot means arranged at the rear side, as a result of a movement of the front hood toward the rear, triggering an upward pivoting movement of the front hood, so that the deformation travel of the hood is increased in the event of the impact of a pedestrian. The pivoting movement is guided, for example, by a four joint hinge, which is otherwise used to pivot the front hood when it is desired to release access to the engine and other parts. In this case too, the front hood is only lifted in the event of very substantial displacement of the front hood, while a weak impact does not displace the front hood toward the rear and therefore upward.

DE-A-197 12 961 describes the arrangement of a front hood on a vehicle in which a hinge is arranged on a hinge mount, which hinge mount, in the event of a collision with a pedestrian, is pivoted upward in order to raise the front hood. A problem of this arrangement is that the hood lock for the front hood defines a pivot axis which does not allow optional displacement of the hinge mount, and consequently the hinge mount described is, for example, blocked.

EP-A-0 926 018, which was published after the priority date of the present application, describes a front hood which permanently lies in a lowered position and, in the event of a collision, is extended if the vehicle is moving at an appropriate speed.

SUMMARY OF THE INVENTION

WO-A-97 18 108 describes a front-hood arrangement in which a collision with a pedestrian is detected by means of an impact sensor, and impact-damping means in the form of an airbag are triggered if, during the collision, the vehicle speed moves within a predetermined range. However, a problem with an arrangement of this type is that of providing an airbag in the outside region of the engine hood, since there it is exposed to external influences, including influences of weather, such as insolation, wet and frost, and therefore it cannot be guaranteed to operate throughout the entire service life of an automobile, and a further drawback is the tightness of reaction time.

JP-A-10 258 774 or JP-A-09 315 266 relates to front-hood arrangements in which the front hood is raised as a result of a collision with a pedestrian being detected and is otherwise retained in a lowered position. A particular problem of this solution is that the reaction times passing between a collision and its detection and the processing of the commands to trigger the device to raise the front hood are generally too long to guarantee that the front hood is actuated in good time. Furthermore, the front hood is also extended if the impact detectors respond, for example, in the event of a parking incident or if an obstacle is driven into at high speed.

JP-A-10 194 158 describes a complex and expensive design of a front-hood arrangement in which the front hood is raised when a collision is detected, for which purpose a sensor is provided in the front part of the vehicle and is read by means of a control unit which also actuates a piston-cylinder unit in order to raise the front hood. The actuating device is only extended when a collision of this type is detected. In this case, at the same time, the vehicle speed and acceleration are used to determine whether this is a collision with an object. To this extent, the assumption is that the account taken of the vehicle speed is used only to establish whether a collision has occurred, and it is not at the same time the case that a speed range limits the raising of the front hood. In this context, it should be noted that, to ensure a passenger impact function, the front hood, if it is desired to restrict the raising of the front hood to an impact situation, must respond within less than one second, preferably less than half a second. Although there are now high-performance computers, it is nevertheless not ensured that the front hood will be completely raised before the head of a pedestrian strikes it. This is the case in particular if the impact takes place in a corner region and therefore, on account of the different resistance on the two actuating devices, tilting is possible, which impedes complete raising of the front hood.

Overall, as yet no solution has been proposed which proposes an inexpensive arrangement, which can be readily restored after use and which is so well developed that it could be used in mass-produced vehicles.

It is the object of the invention to propose a front-hood arrangement and a method that supply pedestrian protection that can be achieved inexpensively and on an industrial scale.

This object is achieved for the front-hood arrangement described at the beginning, according to the invention, in that the hinge has means for displacing a joint, as a function of the speed of the vehicle, into an upper or a lower position, independently of an impact of a pedestrian. This object is achieved for the method described at the beginning, according to the invention, in that the front hood, at least in the region of its hinges, is displaced into a raised position in the event of exceeding a lower threshold or in the event of undershooting an upper threshold for the speed.

DETAILED DESCRIPTION OF THE INVENTION

The arrangement according to the invention enables the front hood to be raised in those speed ranges within which the impact of a pedestrian is particularly dangerous. By contrast, when the vehicle is stationary or traveling at slow speeds, such as when parking, when visibility is particularly important, and at high speeds, at which the aerodynamics of the front hood plays a major role, the hood is in a lowered position, since in both cases the impact of a pedestrian would not lead to his head striking the front-hood. For this purpose, the unit which effects the displacement and which preferably executes a linear movement expediently acts directly on the joint which forms the rotation point of the hood bearing, so that pivoting of the front hood about the hood lock over a corresponding radius is ensured.

In particular, it is possible to design the actuating device as a piston-cylinder unit which can be extended and retracted slowly, while a high-speed device has to be provided in a system which has to be triggered. This can generally only be designed as a single-use device by means of a propelling charge or the like, and requires expensive refit operations for each false alarm. By contrast, the method according to the invention or the front-hood arrangement according to the invention allows the automobile to be used further without problems if contact occurs with the bumper when, for example, the automobile is being parked.

The front hood is preferably raised at speeds of over 10 km/h and is lowered back into its starting position at speeds of over 50 km/h, while the raising also takes place when the speed falls below 45 km/h and the front hood is lowered again when the speed falls below 5 km/h. It is also possible for the front hood only to be lowered once the motor vehicle is stationary, in order to prevent it from constantly moving up and down in city traffic. Moreover, a delay circuit may be provided, with which the lowering of the front hood is only triggered when the vehicle has been stationary for more than an adjustable threshold of, for example, 5 seconds.

For displacement of the joint, there is preferably a piston-cylinder unit arranged on each side of the vehicle frame side member, the piston-side end of which unit bears the joint and the cylinder of which is in each case fixed to one of the frame side members. This is preferably a pneumatically driven piston-cylinder unit which can be compressed in a similar manner to a pneumatic spring and therefore, in the event of a collision with a pedestrian, is also able to convert impact energy into compression and therefore contributes to reducing the consequences of the impact, in particular on the head part of a pedestrian. The pneumatic piston-cylinder unit can expediently be supplied via other equipment in the vehicle which also requires or generates reduced pressure, without tall incurring major costs. The activation unit of the piston-cylinder unit can preferably be switched over in order to be able to act on or empty on both sides of the piston and accordingly to increase the speed of displacement of the piston-cylinder unit. Furthermore, the spring assemblies can be provided to assist the piston-cylinder unit.

The speed is measured by means of a speed sensor and is transmitted via electronic commands, for example in a data bus line, from a central control unit to the lifting means, for example the pneumatic piston-cylinder unit. The displacement of the joint is triggered in response to the preset thresholds being exceeded or undershot. It is additionally possible to lock the lifting member at relatively high speeds, in order to increase the rigidity of the vehicle in the event of a head-on collision with another vehicle.

Expediently, as well as the two lifting units for the joints of the front hood, at the front side thereof a further lifting unit is assigned to the hood lock, and this further lifting unit also raises the front hood in the region of the hood lock; this raising may not be as strong, but is nevertheless perceptible. This is expedient in particular if the hood lock is arranged in the region of the A-pillars of the vehicle or in the region of the windshield, since substantial raising of front-side joints would only slightly cushion the impact of the human head in the vicinity of the windshield. Expediently, however, the front-hood arrangement will be provided with joints arranged at the rear side of the front hood and a hood lock arranged at the front side of the front hood, so that the pivoting of the front hood takes place substantially in the opposite direction to the assumed impact of the head of a pedestrian who has been struck.

Further advantages and features of the invention will emerge from the following description and from the dependent claims.

BRIEF DESCRIPTION OF THE DRAWINGS

The invention is explained in more detail below on the basis of an exemplary embodiment and with reference to the drawing.

FIG. 1 diagrammatically depicts the front part of a motor vehicle with a front-hood arrangement according to the invention.

As can be seen in FIG. 1, the front hood 1 is locked at its front side 2 by means of a hood lock 3, while two hinges 4 which are arranged in the corners of the rear side of the front hood 1 allow pivoting about an axis of a joint 6 which runs substantially horizontally and perpendicular to the direction of travel. The piston-side end of a piston-cylinder unit 15, which can be extended or retracted in reaction to the speed of the vehicle, acts on the joint 6. Alternatively, other lifting motors may also be suitable. In this case, the rotatable coupling of the joint 6 causes the hood lock 3 to produce a pivot axis for raising the front hood 1 in the direction of the arrow P.

The speed of the vehicle is measured, for example, using a sensor on the front axle 16, measurement devices of this type being known and generally also feeding the speedometer in the vehicle with suitable information. A control unit of the piston-cylinder unit 15 reacts to the speed or the speed changes and, in the event of a speed of, for example, 10 or 15 km/h being exceeded, raises the front hood 1, while if a speed of, for example, 55 km/h is exceeded, although this may also be matched to the local speed limit, if appropriate plus an added tolerance, the front hood 1 is lowered again. The front hood 1 is raised again if the speed falls below, for example, 40 km/h, and triggering can also be provided in the event of strong braking deceleration of the vehicle. When the vehicle is stationary or traveling slowly at, for example, 5 km/h, at which speed striking a pedestrian could not have fatal consequences, the front hood 1 is lowered again, in order to increase the driver's view. An electronic holding circuit prevents the front hood 1 from being constantly raised and lowered, for example in city traffic, through the fact that, by way of example, a time of 5 or 10 seconds within which the lowering conditions for the front hood 1 are satisfied must elapse before the lowering of the front hood is triggered. Although this extends the time for which the driver's view may be restricted, at the same time it prevents the front hood from being constantly extended and retracted, which could irritate the driver.

It is possible to refine the front-hood arrangement according to the invention in such a manner that, in addition to the speed data, the acceleration data are also taken into account in the duration which is predetermined by the holding circuit, i.e. in the event of sudden braking the front hood 1 is extended even at a relatively high speed, or the front hood is retracted in the event of sudden acceleration.

The invention has been explained above with reference to an exemplary embodiment in which the piston-side end of the piston-cylinder unit 15 acts directly on the joint 6 which, at the same time, defines the pivot axis when the front hood 1 is opened up to provide access to the engine. Alternatively, it is possible to provide this coupling by means of an intermediate member which itself is designed in a particular way so as to be deformed in the event of an impact from a human body and which, in the retracted state of the front hood 1, is guided or mounted in such a manner that the axial rigidity of the vehicle, which is of importance for its crash behavior, is not impaired.

What is claimed is:

1. A front hood assembly for attachment to a vehicle, comprising a front hood;
   at least one hood lock for closing said front hood, and
   a hinge for coupling said front hood to a frame of said vehicle,
   said hinge comprising means for displacing a joint, as a function of the speed of the vehicle, into an upper or a lower position, independently of an impact of said vehicle with a pedestrian.

2. The front hood assembly as claimed in claim 1, wherein said means for displacing said front hood are triggered in the event of a threshold being undershot, and the displacement means are returned again in the event of a second threshold being reached, wherein the thresholds are speeds of said vehicle.

3. The front hood assembly as claimed in claim 1, wherein said hinges are arranged at the rear part of said front hood and said at least one hood lock is arranged in the front part of the front hood.

4. The method as claimed in claim 1, wherein said means for displacing the joint is for displacing the joint into the upper and the lower position, independently of said impact.

5. A front hood assembly for attachment to a vehicle, comprising
   a front hood; and
   a hinge for coupling said front hood to a frame of said vehicle,
   said hinge comprising means for displacing a joint, as a function of the speed of the vehicle, into an upper or a lower position, independently of an impact of said vehicle with a pedestrian, wherein the displacement of said front hood is triggered in the event of a lower threshold being exceeded, and is returned again in the event of an upper threshold, which is higher than the lower threshold, being exceeded, wherein the thresholds are speeds of said vehicle.

6. The front hood assembly as claimed in claim 5, wherein said means for displacing said front hood comprises a linear lifting drive which acts in an articulated manner on said joint.

7. The front hood assembly as claimed in claim 6, wherein said linear lifting drive is designed as a piston-cylinder unit.

8. The front hood assembly as claimed in claim 7, wherein said piston-cylinder unit is pneumatically actuatable.

9. The front hood assembly as claimed in claim 7, wherein said piston-cylinder unit can be changed to execute a linear movement.

10. The front hood assembly as claimed in claim 5, wherein said means for displacing a joint comprises means for displacing said front hood, and wherein said means for displacing said front hood are actuated in response to signals from a control unit.

11. The front hood assembly as claimed in claim 5, further comprising a hood lock and means for displacing said hood lock into a raised position, means for displacing said hood lock being actuatable in accordance with the displacement of said hinge.

12. The front hood assembly as claimed in claim 5, wherein a minimum time is provided prior to the return movement of the displacement means.

13. A method for actuating the front hood of a vehicle as a function of the vehicle's speed, wherein said vehicle comprises a frame, a front hood, a hinge for coupling said front hood to said frame, and means for displacing said front hood into an upper or a lower position, the method comprising the steps of measuring the speed of said vehicle, comparing said measured speed to a preset lower threshold of vehicle speed and to a preset upper threshold of vehicle speed, and in the event of said vehicle exceeding said lower threshold or in the event of said vehicle undershooting said upper threshold, displacing said front hood, at least in the region of its hinges, into a raised position.

14. The method as claimed in claim 12, wherein said vehicle further comprises at least one hood lock for closing said front hood, and wherein said step of displacing said front hood comprises displacing said front hood into a raised position in the region of said hood lock.

15. The method as claimed in claim 12, wherein said means for displacing said front hood into an upper or a lower position comprises pneumatic piston-cylinder units, and wherein said step of displacing said front hood comprises activation of pneumatic piston-cylinder units.

16. The method as claimed in claim 12, wherein said step of displacing said front hood occurs after said vehicle has exceeded said lower threshold for a preset minimum amount of time or after said vehicle has undershot said upper threshold for a preset minimum amount of time.

\* \* \* \* \*